(12) United States Patent
Seong

(10) Patent No.: US 6,379,003 B1
(45) Date of Patent: Apr. 30, 2002

(54) FOLDABLE GLASSES

(75) Inventor: Phil Moon Seong, Kyunggi-do (KR)

(73) Assignee: Anotherworld Co., Ltd. (KR)

( * ) Notice: Subject to any disclaimer, the term of this patent is extended or adjusted under 35 U.S.C. 154(b) by 0 days.

(21) Appl. No.: 09/829,042

(22) Filed: Apr. 9, 2001

(30) Foreign Application Priority Data

Dec. 7, 2000 (KR) ............................................. 00-34342

(51) Int. Cl.[7] ................................................. G02C 5/08
(52) U.S. Cl. ............................ 351/63; 351/41; 351/156
(58) Field of Search ................................. 351/63, 41, 44, 351/156; 2/452, 454

(56) References Cited

U.S. PATENT DOCUMENTS 5,956,117 A * 9/1999 Suh et al. .................... 351/156
6,048,062 A 4/2000 Chow .......................... 351/63
6,247,811 B1 * 6/2001 Rhoades et al. ............. 351/156

* cited by examiner

*Primary Examiner*—Huy Mai
(74) *Attorney, Agent, or Firm*—TraskBritt

(57) ABSTRACT

Disclosed is a foldable glasses including a rear banding member which is made of resin, surrounds a rear of a human head and has projected end portions, legs having receiving grooves formed on end portions thereof so that the projected end portions are received into the receiving grooves, respectively, and lens supporting members hinge-connected to the legs so that the lens supporting members are rotated centering around the legs, respectively. The inner diameter of the foldable glasses is adjusted by the movement of the rear banding member, and thus the user can have a good feeling in wearing the glasses. Also, since the lens supporting members are rotated, the inconvenience caused by the frequent wearing/removing of the glasses is minimized.

4 Claims, 4 Drawing Sheets

FOLDABLE GLASSES

BACKGROUND OF THE INVENTION

1. Field of the Invention

The present invention relates to foldable glasses, and more particularly to foldable glasses wherein lens-supporting members including lenses that help perception of objects can be rotated.

2. Description of the Related Art

Generally, the conventional glasses regard the size and design of the lens as of great importance, but are uniformly manufactured irrespective of the distance between a user's eye and ear. Accordingly, the user who wears the glasses may feel a pain on upper portions of his/her ear and nose. Also, the user who has the habit of frequently wearing/removing the glasses must remember positions where his/her glasses are put.

SUMMARY OF THE INVENTION

Therefore, an object of the invention is to solve the problems involved in the related art, and to provide foldable glasses that enable rotation of lens-supporting members which are in the form of a closed channel and includes lenses that help perception of objects, and whose inner diameter is adjusted according to the distance between the user's eye and ear.

According to the present invention, slip-down of the glasses is prevented, and the pain on the upper portion of the user's ear and nose is minimized. Also, the inconvenience caused by the frequent wearing/removing of the glasses is eliminated, and it is not required for the user to remember the location of the glasses.

In accordance with the present invention, there is provided foldable glasses comprising a rear banding member, a pair of legs fastened to the rear banding member by a fastening mechanism so that the rear banding member is movably engaged with and fixed to the legs in a multistage manner, and a pair of lens-supporting members rotatably fastened to the legs, respectively.

BRIEF DESCRIPTION OF THE DRAWINGS

The above object, and other features and advantages of the present invention will become more apparent after a reading of the following detailed description when taken in conjunction with the drawings, in which.

DETAILED DESCRIPTION OF THE PREFERRED EMBODIMENTS

Hereinafter, foldable glasses in accordance with the present invention will be described with respect to embodiments illustrated in the annexed drawings.

Figure 1:
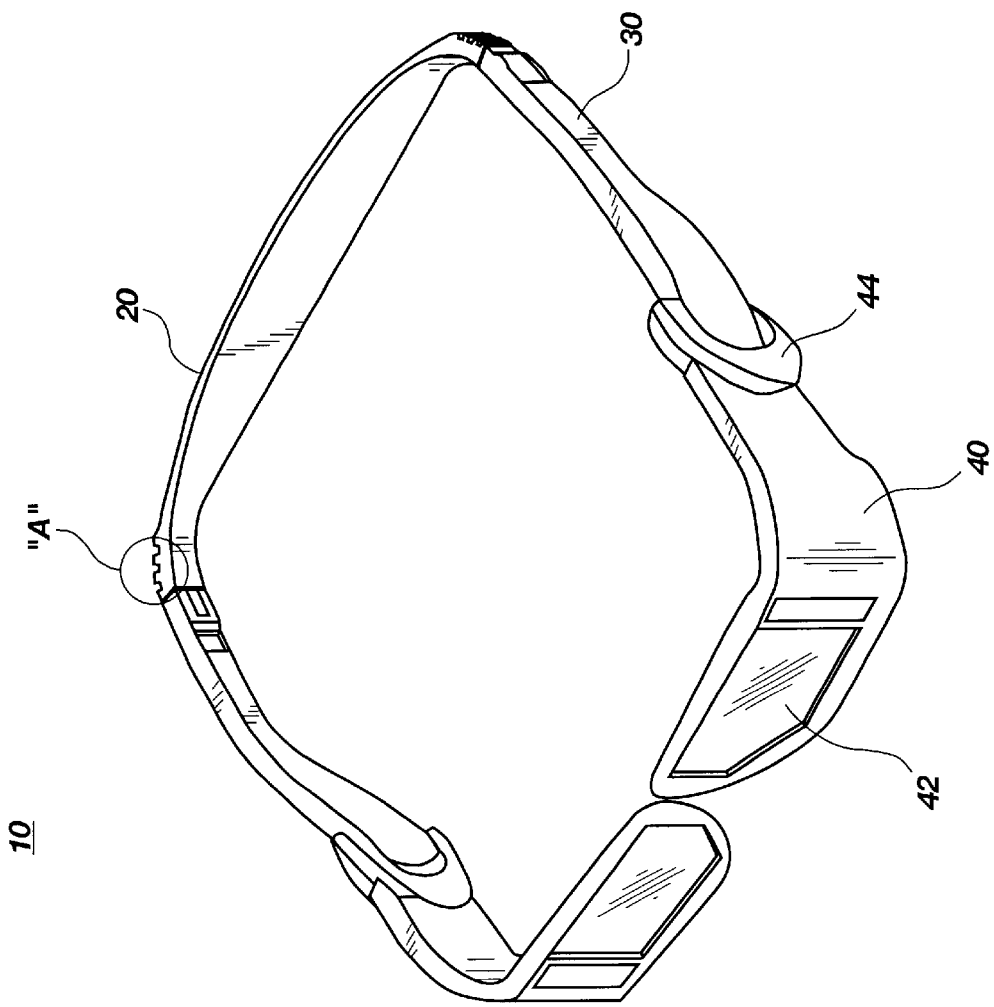
FIG. 1 is a perspective view illustrating foldable glasses according to a preferred embodiment of the present invention.
Figure 2:
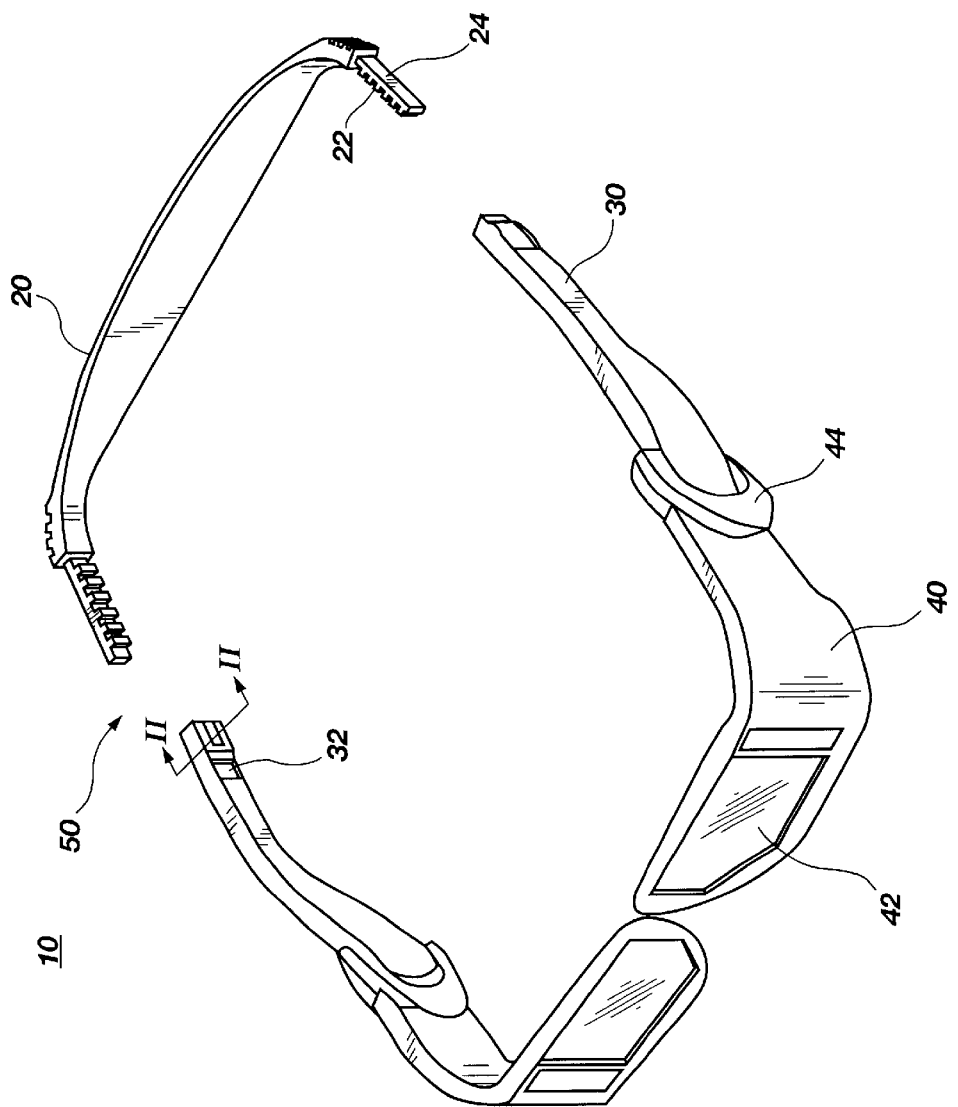
FIG. 2 is an exploded perspective view of the foldable glasses of FIG. 1.
Figure 3:
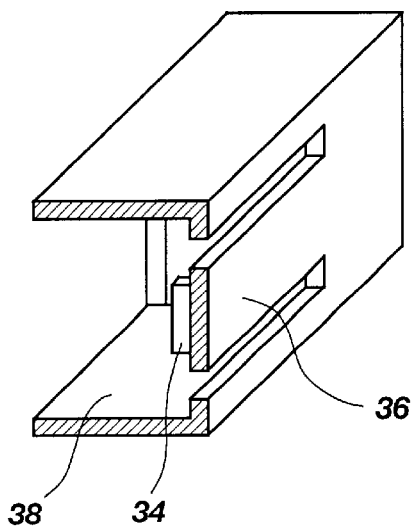
FIG. 3 is a sectional view taken along the line II—II in FIG. 2.

FIG. 1 is a perspective view illustrating foldable glasses according to a preferred embodiment of the present invention, FIG. 2 is an exploded perspective view of the foldable glasses of FIG. 1, and FIG. 3 is a sectional view taken along the line II—II in FIG. 2.

As shown in FIGS. 1 to 3, the foldable glasses 10 includes a rear banding member 20, a pair of legs 30 fastened to the rear banding member 20 by a fastening mechanism 50 so that both front end portions of the rear banding member 20 are movably engaged with and fixed to rear end portions of the legs 30, and a pair of lens-supporting members 40 rotatably fastened to front end portions of the legs 44, respectively.

Here, it is preferable that the foldable glasses 10 are in the form of a closed channel that is bent so as to properly match the girth of a user's head portion where the user's eyes are located, and are made of resinous material having resilience.

On an inner surface of each front end portion of the rear banding member 20 is formed a length-adjusting latch 24 which includes a plurality of positioning bosses 22 protruded inwardly from the front end portion.

On each rear end portion of the legs 30 are formed a latching slot 32 and a resilient piece 36 so that they match the inner surfaces of the front end portions of the rear banding member 20, and a receiving groove 38 for a predetermined length.

It is preferable that a fixing boss 34 is formed on the resilient piece 36.

The fastening mechanism 50 is for adjusting the inner diameter of the foldable glasses 10, and is composed of the length-adjusting latch 24 of the rear banding member 20, and the latching slot 32 and the resilient piece 36 of the legs 30.

Here, the fastening mechanism 50 operates in a manner that the length-adjusting latch 24 is inserted into the receiving groove 38, and then the rear banding member 20 and the legs 30 are fastened by mutual locking operation of the positioning bosses 22 of the length-adjusting latch 24 and the resilient piece 36 and latching slot 32 of the legs 30 to determine the size of the inner diameter of the foldable glasses 10.

Each lens supporting member 30 includes a lens 42 that helps perception of objects and a semicircular hinge portion 44 formed on the rear end portion of the lens supporting member.

Each leg 30 is rotatably engaged with the lens supporting member 40 through the hinge portion 44.

The reference numeral "A" in FIG. 1 denotes a bent portion of the rear banding member 20 reinforced to protect itself from external and internal pressures.

Figure 4:
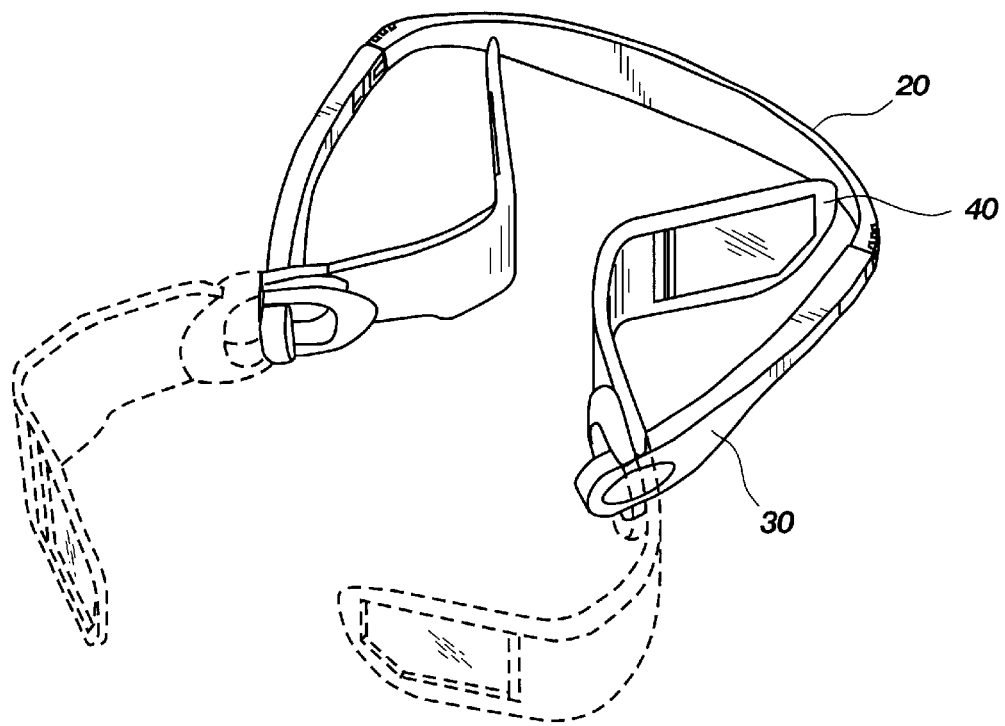
FIG. 4 is a schematic view illustrating the foldable glasses with lens support members rotated according to a preferred embodiment of the present invention.

FIG. 4 is a schematic view illustrating the foldable glasses with the lens support members rotated according to a preferred embodiment of the present invention.

Referring to FIG. 4, the lens supporting member 40 of the foldable glasses 10 is rotatable toward the leg 30 and in a direction opposite to the leg 30.

Also, the lens supporting member 40 can be rotated within a predetermined range of angle in accordance with the hinge portion 44 or the engaged position of the hinge portion 44.

Now, the operation of the foldable glasses according to the preferred embodiment of the present invention will be explained.

The inner diameter of the foldable glasses 10 is adjusted as the rear banding member 20 moves in the longitudinal direction by the fastening mechanism 50. Then, if the foldable glasses 10 are resiliently put on the user's head, the leg 30 is placed in a specified position between the upper portion of the user's ear and head, and the lens supporting member 40 is rotated to place the user's eye and the lens 42 in a straight line.

Hereinafter, the foldable glasses according to another embodiment of the present invention will be explained with reference to the accompanying drawings.

Figure 5:
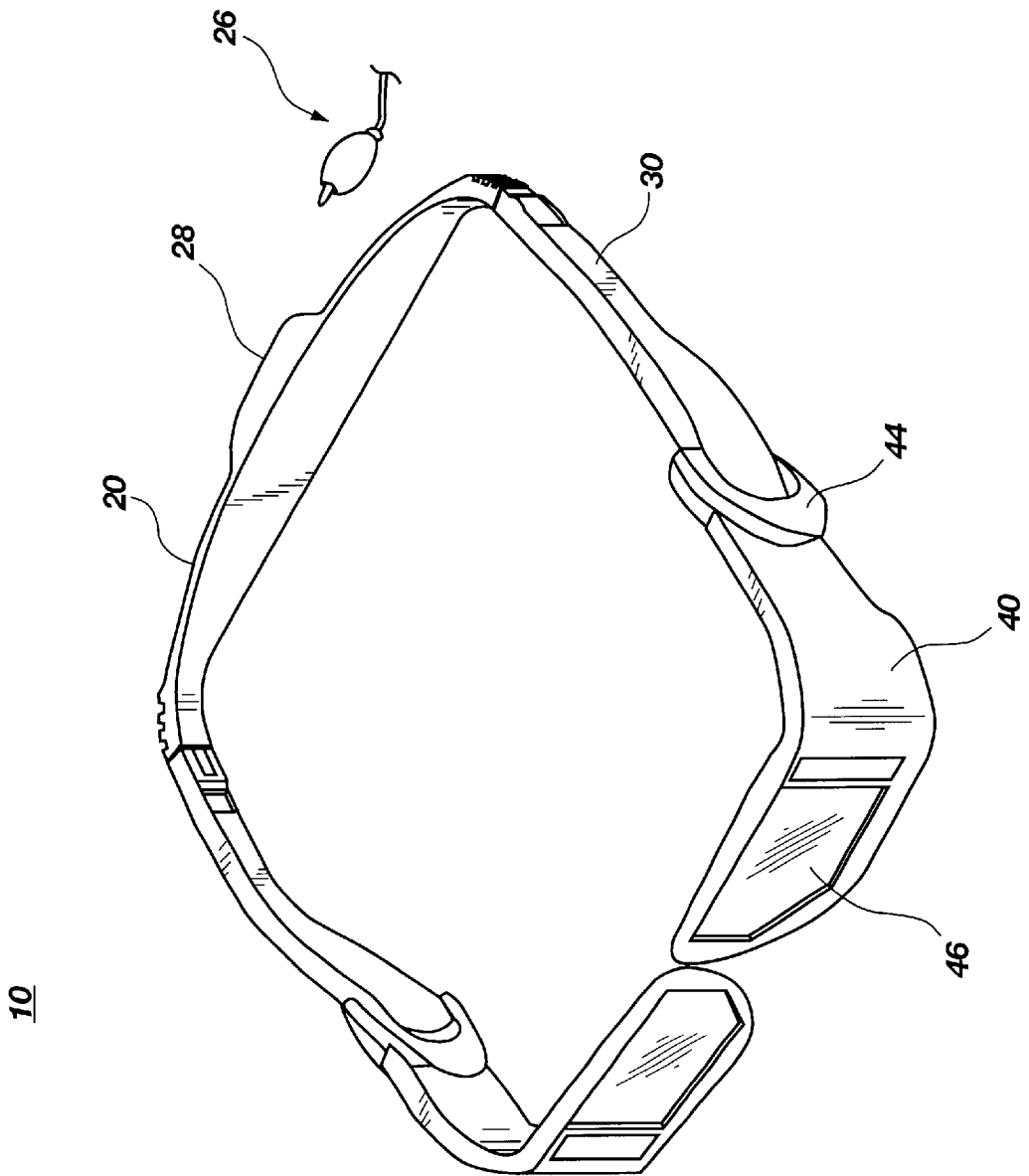
FIG. 5 is a perspective view illustrating foldable glasses according to another embodiment of the present invention.

FIG. 5 is a perspective view illustrating the foldable glasses according to another embodiment of the present invention. In FIG. 5, the same reference numerals as in FIGS. 1 and 2 denote the same constituent elements having the same function.

Referring to FIG. 5, the foldable glasses includes an input terminal 28, mounted on a specified position of a rear banding member 20, for being connected to an input jack 26 that is connected to an input device (not illustrated).

Also, left and right liquid crystal shutters 28 for outputting an image signal inputted to the input terminal 28 is mounted on lens supporting members 40.

It is preferable that a cable for transferring the image signal from the input terminal 28 to the liquid crystal shutters 46 is built in the foldable glasses 10.

The operation of the foldable glasses according to another embodiment of the present invention as constructed above will be explained.

First, if the user wears the foldable glasses 10 in the same manner as that according to the preferred embodiment of the present invention, the image signal is inputted to the input terminal 28 through the input jack 26, and then transferred to the left and right liquid crystal shutters 46.

Specifically, the image signal is divided into a left-eye image signal and a right-eye image signal which correspond to even and odd fields of a three-dimensional video monitor (not illustrated), and then outputted through the left and right liquid crystal shutters 46 to provide a three-dimensional image to the user.

Although the preferred embodiments of the foldable glasses in accordance with the present invention have been disclosed for illustrative purposes, those skilled in the art will appreciate that various modifications, additions and substitutions are possible, without departing from the scope and spirit of the invention as disclosed in the accompanying claims.

As apparent from the above description, the foldable glasses according to the present invention have the following advantages.

First, the inner diameter of the foldable glasses can be adjusted according to the size of the user's head, i.e., according to the distance between the user's eye and ear, and thus the user can have a good feeling in wearing the glasses.

Second, since the lens supporting members including lenses can be rotated, the inconvenience caused by the frequent wearing/removing of the glasses is minimized, and it is not required for the user to remember the location of the glasses.

Third, the slip-down of the glasses is prevented, and this provides convenience in use.

What is claimed is:

1. A foldable glasses comprising:

a rear banding member made of flexible material, the rear banding member surrounding a rear of a human head and having projected end portions;

a plurality of legs having receiving grooves formed on end portions thereof so that the projected end portions are received into the receiving grooves, respectively; and a plurality of lens supporting members hinge-connected to the legs so that the lens supporting members are rotated centering around the legs, respectively.

2. The foldable glasses as claimed in claim 1, wherein each of the lens supporting members includes a hinge portion hinge-connected to the leg so that the lens supporting member is rotated within a range of angle where a user's view is not obstructed.

3. The foldable glasses as claimed in claim 1, wherein the receiving groove of the leg and the projected end portion of the rear banding member include a fastening mechanism for fastening the receiving groove and the projected end portion in a multistage manner with their length adjusted.

4. The foldable glasses as claimed in claim 1, wherein a lens attached to the lens supporting member is a liquid crystal shutter.

* * * * *